United States Patent
Sharma

(10) Patent No.: US 10,167,531 B2
(45) Date of Patent: Jan. 1, 2019

(54) PROCESSING OF LITHIUM CONTAINING MATERIAL

(71) Applicants: REED ADVANCED MATERIALS PTY LTD, West Perth, Western Australia (AU); Yatendra Sharma, Hillarys, Western Australia (AU)

(72) Inventor: Yatendra Sharma, Hillarys (AU)

(73) Assignee: Reed Advanced Materials Pty Ltd, West Perth (AU)

(*) Notice: Subject to any disclaimer, the term of this patent is extended or adjusted under 35 U.S.C. 154(b) by 0 days.

(21) Appl. No.: 15/875,267

(22) Filed: Jan. 19, 2018

(65) Prior Publication Data

US 2018/0142325 A1   May 24, 2018

Related U.S. Application Data

(63) Continuation of application No. 14/344,632, filed on Mar. 13, 2014.

(51) Int. Cl.
*C22B 26/12* (2006.01)
*C22B 3/44* (2006.01)
(Continued)

(52) U.S. Cl.
CPC .............. *C22B 26/12* (2013.01); *C01B 7/012* (2013.01); *C01D 15/02* (2013.01); *C01D 15/04* (2013.01); *C01D 15/08* (2013.01); *C22B 3/10* (2013.01); *C22B 3/42* (2013.01); *C22B 3/44* (2013.01); *C22B 4/02* (2013.01); *C25B 1/16* (2013.01); *C25B 1/34* (2013.01); *Y02P 10/234* (2015.11)

(58) Field of Classification Search
CPC ................................ C22B 3/44; C22B 26/12
See application file for complete search history.

(56) References Cited

U.S. PATENT DOCUMENTS 2,803,518 A    8/1957  Reader
3,044,850 A *  7/1962  Denton ................ B01J 27/1806
                                                        423/313
(Continued)

FOREIGN PATENT DOCUMENTS

CA    2 786 317 A1    7/2011
GB      750336 A      6/1956
(Continued)

OTHER PUBLICATIONS http://earth.geology.yale.edu/~ajs/1960/ajs_258A_11.pdf/312.pdf "Crystal Chemistry of Beta-Spodumene solid solutions on the join L12O.A12O3-SiOs", Brian J. Skinner and Howard T. Evans, Jr., US Geological Survey, Washington, DC., vol. 258-A, 1960, pp. 312-324.

Primary Examiner — Melissa S Swain
(74) Attorney, Agent, or Firm — Clements Bernard Walker PLLC; Christopher L. Bernard

(57) ABSTRACT

A process (10) for the treatment of a lithium containing material, the process comprising the steps of:
(i) Preparing a process solution from the lithium containing material (12);
(ii) Passing the process solution from step (i) to a series of impurity removal steps (36) thereby providing a substantially purified lithium chloride solution; and
(iii) Passing the purified lithium chloride solution of step (ii) to an electrolysis step (70) thereby producing a lithium hydroxide solution.

20 Claims, 1 Drawing Sheet

(51) Int. Cl.
    *C22B 4/02*         (2006.01)
    *C22B 3/42*         (2006.01)
    *C25B 1/16*         (2006.01)
    *C22B 3/10*         (2006.01)
    *C01D 15/02*       (2006.01)
    *C01D 15/08*       (2006.01)
    *C01D 15/04*       (2006.01)
    *C01B 7/01*         (2006.01)
    *C25B 1/34*         (2006.01)

(56) References Cited

U.S. PATENT DOCUMENTS

| | | |
|---|---|---|
| 3,883,348 A * | 5/1975 | Acoveno ............... C01G 21/06 |
| | | 423/420 |
| 4,036,713 A | 7/1977 | Brown |
| 4,124,684 A | 11/1978 | Olivier et al. |
| 4,412,838 A | 11/1983 | Ertl et al. |
| 5,354,358 A | 10/1994 | Litz et al. |
| 8,057,764 B2 | 11/2011 | Boryta et al. |
| 2009/0241731 A1 | 10/2009 | Pereira et al. |
| 2011/0044882 A1 | 2/2011 | Buckley et al. |
| 2011/0200508 A1 | 8/2011 | Harrison et al. |

FOREIGN PATENT DOCUMENTS

| | | |
|---|---|---|
| GB | 972142 A | 10/1964 |
| JP | 2009-269810 A | 11/2009 |
| JP | 2011-031232 A | 2/2011 |
| WO | 2011/133165 A1 | 10/2011 |

* cited by examiner

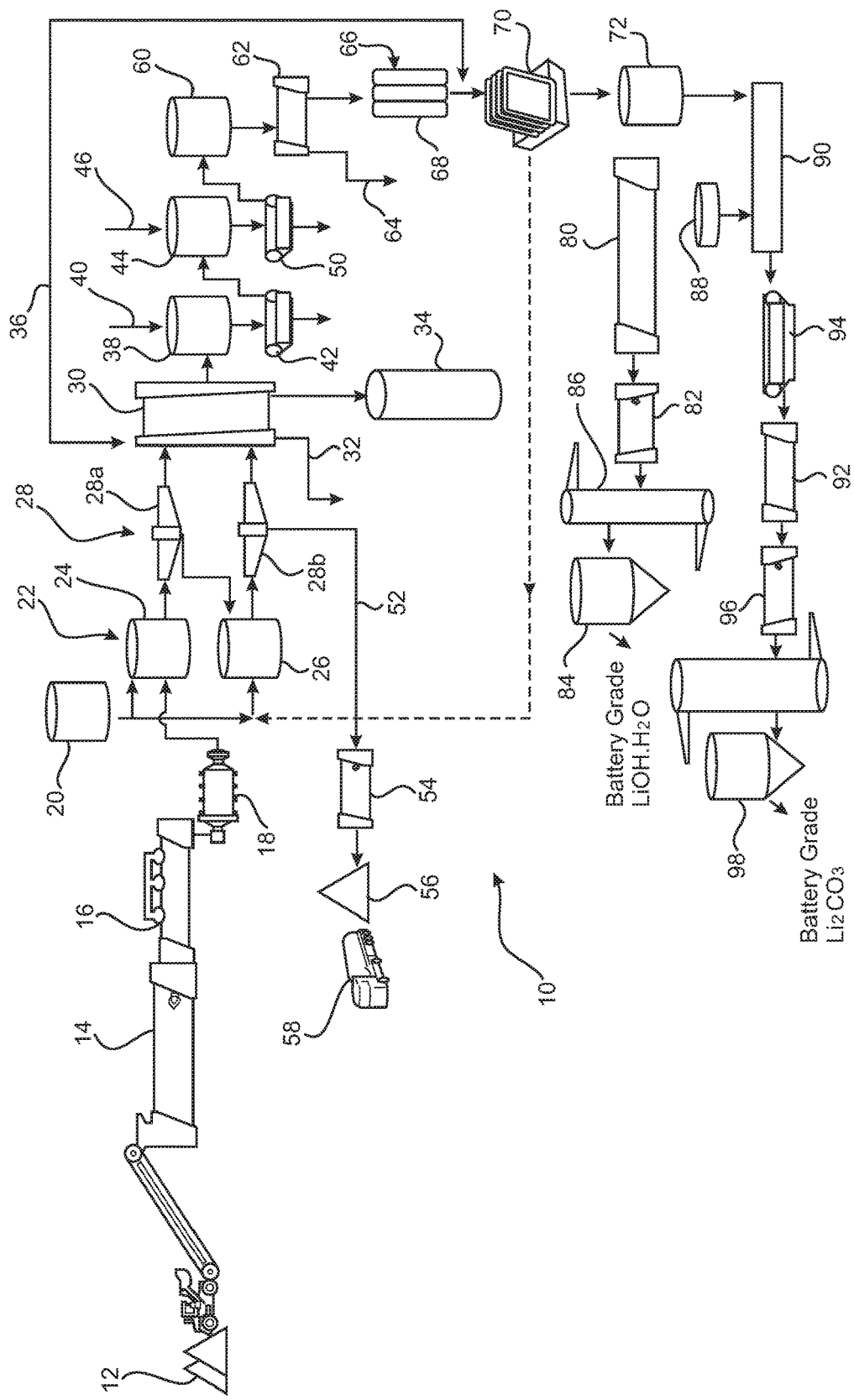

PROCESSING OF LITHIUM CONTAINING MATERIAL

This application is a continuation of U.S. patent application Ser. No. 14/344,632 filed on 13 Mar. 2014.

FIELD OF THE INVENTION

The present invention relates to the treatment of lithium containing material.

More particularly, the present invention relates to a process for the treatment of a lithium containing material and the production of lithium hydroxide and lithium carbonate. The process utilising the electrolysis of a lithium chloride solution obtained from either a spodumene ore or concentrate, or from brines. In one form, the process of the present invention is intended to provide a high purity or battery grade lithium hydroxide and lithium carbonate product.

The process of the present invention may further provide a hydrochloric acid product. Still further, the process of the present invention, in one form, utilises precious metal containing mixed metal oxide (MMO) electrodes to heighten the efficiency of an electrochemical portion of the process.

BACKGROUND ART

Known processes for the production of lithium carbonate from lithium containing ores or concentrates typically utilise the thermal treatment of an alpha-spodumene ore or concentrate. This thermal treatment can be referred as decrepitation and transforms the alpha-spodumene to beta-spodumene which is in turn able to be solubilised by acid. The step in which the beta-spodumene is solubilised in acid takes place in a kiln and produces soluble lithium salt. The lithium salt is passed to one or more tanks in which the lithium salt is purified. Leached crude lithium salt is subsequently passed to a step in which the pH of the slurry is adjusted, whereby certain impurities, including iron and magnesium are intended to be precipitated. Thus purified lithium salt is treated with soda ash to produce lithium carbonate. This lithium carbonate can be further treated with hydrated lime to produce lithium hydroxide.

Processes for the production of lithium carbonate and lithium hydroxide from brines typically involves the use of evaporation ponds to increase the concentration of the salts contained therein before being passed to a series of steps aimed to reduce the impurities present.

The above described processes of the prior art are relatively inefficient in the removal of impurities remaining in the pregnant leach solution, which results in a relatively impure lithium hydroxide and lithium carbonate product. This is particularly problematic when attempting to produce high quality or battery grade lithium hydroxide and lithium carbonate products.

The process of the present invention has as one object thereof to overcome substantially one or more of the above mentioned problems associated with prior art processes, or to at least provide a useful alternative thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The term "battery grade lithium carbonate" refers to a product having a purity of about 99.5% or higher. Similarly, the term "battery grade lithium hydroxide" refers to a product having a purity of about 99% or higher.

DISCLOSURE OF THE INVENTION

In accordance with the present invention there is provided a process for the treatment of a lithium containing material, the process comprising the steps of:
(i) Preparing a process solution from the lithium containing material;
(ii) Passing the process solution from step (i) to a series of impurity removal steps thereby providing a substantially purified lithium chloride solution;
(iii) Passing the purified lithium chloride solution of step (ii) to an electrolysis step thereby producing a lithium hydroxide solution; and
(iv) Carbonating the lithium hydroxide solution produced in step (iii) by passing compressed carbon dioxide through the solution, thereby producing a lithium carbonate precipitate,
wherein the lithium containing material is an alpha-spodumene ore or ore concentrate and the process further comprises a first step in which that alpha-spodumene ore or ore concentrate is calcined to produce beta-spodumene.

In one form of the present invention, the process solution of step (i) is prepared in the form of a pregnant leach solution. Preferably, the pregnant leach solution is formed by passing a lithium containing material to a leach step in which the material is leached with hydrochloric acid.

Preferably, the impurity removal step (ii) further comprises a concentration step wherein the pregnant leach solution is concentrated to near saturation of lithium chloride.

The lithium hydroxide solution produced in step (iii) may be thickened by evaporation of water to provide lithium hydroxide monohydrate crystals.

In a further form of the present invention a first portion of the lithium hydroxide solution produced in step (iii) is thickened by evaporation/crystallisation to provide lithium hydroxide monohydrate crystals and a second portion thereof is carbonated by passing compressed carbon dioxide through the solution, thereby producing a lithium carbonate precipitate.

Preferably, the impurity removal steps of step (ii) include one or more of hyrdropyrolysis of Al and Fe chlorides, pH increase to precipitate hydroxides of Al, Fe, Mg and Mn, lithium carbonate precipitation for removal of Ca, and fractional crystalisation for the removal of Na and K.

Still preferably, the fractional crystallisation for the removal of Na and K is conducted immediately after the concentration step.

The impurity removal steps preferably further comprises an ion exchange step. Preferably, the ion exchange step removes substantially all calcium, magnesium and other multivalent cations remaining in the pregnant leach solution. Still preferably, such multivalent cations are removed to a level of less than about 10 ppm.

Still preferably, water evaporated from the solution in evaporation/crystallisation is recompressed, combined with make-up steam and utilised in evaporation/crystallisation. The evaporation/crystallisation step preferably utilises a vacuum evaporative crystalliser.

Preferably, the beta-spodumene is cooled and milled prior to the leach step. The beta-spodumene is preferably milled to less than about 300 µm. Still preferably, the beta-spodumene is milled to a $P_{80}$ of about 75 µm.

Preferably, the leach step is conducted at elevated temperature.

The hydrochloric acid solution used in the leach step is preferably about 20% HCl w/w.

Still preferably, the elevated temperature of the leach step is about the boiling point of the hydrochloric acid solution used in the leach step.

The leach step is preferably conducted at atmospheric pressure.

In one form of the present invention the leach step is conducted in a chlorination kiln at about 108° C. over a residence time of about 6 to 10 hours. Preferably, the residence time is about 8 hours.

BRIEF DESCRIPTION OF THE DRAWINGS

The process of the present invention will now be described, by way of example only, with reference to one embodiment thereof and the accompanying drawing, in which: —

FIG. 1 is a schematic flow-sheet depicting a process for the treatment of a lithium containing material in accordance with a first embodiment of the present invention in which the lithium containing material is an alpha-spodumene concentrate.

BEST MODE(S) FOR CARRYING OUT THE INVENTION

In FIG. 1 there is shown a process 10 for the treatment of a lithium containing material in accordance with a first embodiment of the present invention in which embodiment the lithium containing material is provided in the form of an alpha-spodumene concentrate.

All of the unit operations embodied in the process 10 are intended to operate continuously with full process instrumentation and control being provided for.

An alpha-spodumene concentrate 12 is passed to a calcining step in which the concentrate 12 is calcined in a calcining furnace 14 at a temperature of between about 1050° C. to 1100° C. to convert the alpha-spodumene to leachable beta-spodumene. Off-gases from the calciner are directed through a cyclone (not shown) and an electrostatic precipitator (not shown) specified to comply with known environmental emissions limits. The resulting hot calcine is passed to a cooler 16 and indirectly cooled to about 80° C. It is then dry-milled to less than 300 µm, for example to a $P_{80}$ of about 75 µm, in a mill, for example a closed circuit ball mill 18.

After storage in a surge bin (not shown), the milled beta-spodumene is mixed with at least a 40 to 300% stoichiometric excess of 20% hydrochloric acid w/w 20 in a slurrying step. The slurrying step feeds a leach step, for example a leach circuit 22, comprising a first leach stage 24 and a second leach stage 26.

The leach step is conducted at about 108° C., being the boiling point of the hydrochloric acid leach solution added in the slurrying step, for a period of about 6 to 12 hours, for example about 8 hours, in continuous leach tanks at atmospheric pressure. A pulp density of about 40% is used in the leach circuit 22 to maximise the leach concentration and to ensure that the solubility limit of lithium chloride during leaching is not exceeded. Off-gases are cleaned in a wet scrubber (not shown). The leach step 22 produces a residue slurry and a process solution, for example a pregnant leach solution (PLS). The lithium and the aluminosilicate in the beta-spodumene leaches into solution with other impurities to give a sub-saturated concentration of lithium chloride in the PLS.

In the leach step there is significant dissolution of aluminium together with the target lithium. The results of a single stage HCl leach of a milled beta-spodumene are shown below in Table 1. The aluminium forms $AlCl_3$ in the presence of excess HCl in the PLS. The formed $AlCl_3$ is found to passivate the beta-spodumene in the leach step and the Applicants have not been able to achieve a dissolution of more than about 71% of the lithium present in the beta-spodumene. Such a yield of lithium is considered too low for economic feasibility.

TABLE 1

| Process and Conditions | Solution Composition (g/l) | | | Li yield (%) |
|---|---|---|---|---|
| | Li | Al | Fe | |
| HCl leach, single stage, 8 hrs, 108° C. | 17 | 19 | 4.5 | 71 |

The pregnant leach solution from the leach circuit 22 is passed to a thickening circuit 28, comprising two stages 28a and 28b aligned with the stages 24 and 26 of the leach circuit 22. An overflow from the thickening circuit 28 is directed to a pyrohydrolysis step 30, operating at about 300° C., and in which chlorides of Al and Fe present in the pregnant leach solution are converted into their respective insoluble oxides 32. Any residual HCl is also recovered in an HCl removal step 34 for re-use in the slurrying step and leaching circuit 22 as described above.

The Applicants have found that through the introduction of the second leach stage 26 the passivation of the beta-spodumene is largely overcome and the yield of lithium is greatly improved compared to a single stage HCl leach. The bulk of the soluble ions from the PLS from the first leach stage 24, which includes lithium and aluminium, are separated in the first stage 28a of the thickening circuit 28 and are passed as thickener overflow to the pyrohydrolysis step 30. An underflow of the first stage 28a of the thickening circuit 28, or a leach residue, is passed to the second leach stage 26. An overflow of the second stage 28b of the thickening circuit 28 is also passed to the pyrohydrolysis step 30. The total lithium recovery from the leach circuit is greater than about 92%.

In addition to the much improved yield of lithium through introduction of the two stage leach circuit 22, the yield of Al reaches about 25% and Fe nearly 80%. Both Al and Fe consume substantial quantities of HCl which, if unrecovered, negatively impacts the economic viability of the process 10 of the present invention. As noted above, the pyrohydrolysis step 30 allows the recovery of HCl. The recovery of HCl is achieved in the pyrohydrolysis step 30 both through evaporation of excess HCl from the PLS passed from the thickening circuit 28 and also from the pyrolysis of crystallised chlorides of Al and Fe.

In addition to the Al and Fe described above as being recovered using the pyrohydrolysis step 30, remaining soluble iron, aluminium and magnesium are removed in large part from the leach liquor through a series of impurity removal steps, indicated in a broad sense by impurity removal steps 36 in FIG. 1. The impurity removal steps 36 further include a pH modification step 38 through the addition of LiOH 40 to raise the pH to about 9. The product of step 38 is passed to a belt filter 42 from which Al, Fe, Mn and Mg containing precipitates are recovered. The impurity removal steps 36 further include a calcium precipitation step 44 with the addition of either sodium carbonate (soda ash) or lithium carbonate 46, producing a calcium containing precipitate 48 from a further belt filter 50.

A thickener underflow product 52 of the second thickening step 28b is passed to a drying step 54 before passing to waste 56 and subsequent disposal 58.

The liquid product of the belt filter 50, being largely LiCl solution, is passed to a concentration step 60 and in turn to a fractional crystallisation step 62. In the concentration step 60 the LiCl solution is concentrated to near saturation point, for example 35 to 40% LiCl w/w, and is cooled to a sub zero temperature. In the subsequent fractional crystallisation step 62 Na and K impurities 64 are largely removed, as NaCl and KCl crystals, respectively, by filtration.

After the removal of substantially all impurities as described above, the lithium chloride solution is passed through an ion exchange step 66, comprising an Ion Exchange (IX) column 68 by which substantially all of any residual calcium, magnesium and other multivalent cations are removed to a level of less than about 10 ppm, for example 1 ppm.

The further purified lithium chloride solution is then heated to 90° C. and pumped to an electrolysis step 70 comprising a number of electrolysers, for example 6 to 20 electrolysers, in which only lithium chloride and water are consumed to produce only lithium hydroxide, chlorine and hydrogen.

After passing through the electrolysers, the weak or depleted lithium chloride solution contains dissolved chlorine gas. Before this weak lithium chloride solution is recycled to the slurrying step immediately prior to the leach circuit 22, the dissolved chlorine is removed in two stages. In a first stage hydrochloric acid is added to the lithium chloride solution to reduce the pH to <5 which forces some of the chlorine gas out of solution. The remaining dissolved chlorine gas is then removed by air stripping the solution (not shown).

Chlorine and hydrogen produced as by-products are combined to produce HCl acid which is used in the slurrying step and leaching circuit 22.

The lithium hydroxide solution obtained from the electrolysis step 70 is passed firstly to a holding tank 72, from which it can either be (i) evaporated and crystallised to produce lithium hydroxide monohydrate crystals, or (ii) sent to carbonation step to convert into lithium carbonate, as clearly shown in FIG. 1.

In the first of these options, the lithium hydroxide in solution is crystallised in, for example, a vacuum evaporative crystalliser 80 (Oslo type) operating at a temperature of about 80° C. and pressure of about 45 kPa(a). The residence time is about 60 minutes so as to achieve a coarse crystal product. The resulting water vapour is recompressed, combined with make-up steam and used as the heating medium for the crystalliser 80.

Lithium hydroxide crystals are washed by cold water (not shown) achieving a wash efficiency of 99%. The resulting wash solution is recycled back to the leach circuit 22 as noted above. Solids from the centrifuge are fed to an indirect-fired kiln or dryer 82, operating at about 120° C., which dries the crystals. The crystal product, being battery grade LiOH.H$_2$O, is pneumatically conveyed to product bins 84, and cooled to 50° C. in a jacketed screw conveyer 86 as it is conveyed ultimately to bagging stations (not shown).

In the second option noted above, lithium carbonate may be produced by carbonation of lithium hydroxide solution by passing compressed carbon dioxide gas 88 though the solution of lithium hydroxide in a carbonation vessel 90 in which lithium carbonate is precipitated. This slurry is fed to a washer/centrifuge 92 by way of a filter 94, after which wash water is recycled with any remaining lithium hydroxide solution or mother liquor to electrolysis 70. Wet lithium carbonate crystals are fed to a dryer 96 in which hot air is used to dry the crystals. Medium pressure air is used to heat the air. After drying the battery grade lithium carbonate may be micronized to a particle size requested by a customer prior to passing to storage bins 98 and subsequent bagging (not shown).

Condensate throughout the process is used as make-up water for hot process water, cold process water and cooling water. As the process does not return condensate there is an overall positive water balance and about $\frac{1}{10}^{th}$ of the process water is discharged to a sewerage system (not shown).

It is envisaged that tantalite and alumina may also be recovered using the process of the present invention. The filter cake from the thickening step may be discharged to a tantalite recovery plant (not shown). Discharge from the tantalite recovery plant may be fed onto a belt filter to remove water, which is returned to the tantalite recovery plant. The filter does not use washing and has a filtration are of 19 m$^2$. The filter cake from the belt filter is dried in a direct-fired kiln. The dry alumina silicate is cooled to 50° C. in a jacketed screw conveyor and then pneumatically conveyed to a storage bin prior to dispatch.

In accordance with a second embodiment of the present invention the lithium containing material may be provided in the form of a lithium containing brine. Brines do not require the calcining, cooling, milling and leach steps as described for the first embodiment of the present invention but it is envisaged that the remainder of the process will be substantially similar to that of the first embodiment described above.

As can be seen from the above, the process of the present invention provides a process by which a high purity or battery grade lithium hydroxide and lithium carbonate products may be obtained from an alpha-spodumene ore or concentrate, or from a lithium containing brine, whilst also allowing the production of a hydrogen chloride gas product.

Modifications and variations such as would be apparent to the skilled addressee are considered to fall within the scope of the present invention.

The invention claimed is:

1. A process for treatment of a lithium containing material, the process comprising the steps of:
   (i) passing a lithium containing material to a leach step comprising a first leach stage and a second leach stage in which said lithium containing material is leached with hydrochloric acid to produce a pregnant leach solution;
   (ii) passing said pregnant leach solution to a thickening step comprising a first thickening stage coupled subsequent to the first leach stage and a second thickening stage coupled subsequent to the second leach stage and subsequently pyrohydrolysing an overflow from said first thickening stage and an overflow from said second thickening stage, thereby converting any chlorides of aluminum and iron into insoluble oxides, removing same, and recovering residual hydrochloric acid that is utilized in the leach step (i), wherein an underflow from the first thickening stage coupled subsequent to the first leach stage is passed to the second leach stage and the second thickening stage coupled subsequent to the second leach stage, and wherein an underflow from the second thickening stage coupled subsequent to the second leach stage is passed to waste;

(iii) passing said pregnant leach solution from step (ii) to a series of impurity removal steps thereby providing a substantially purified lithium chloride solution;

(iv) passing the purified lithium chloride solution of step (iii) to an electrolysis step in which lithium chloride and added water are consumed thereby producing a lithium hydroxide solution, chlorine, and hydrogen;

(v) combining chlorine and hydrogen produced in the electrolysis step (iv) to produce hydrochloric acid that is utilized in the leach step (i); and (vi) carbonating the lithium hydroxide solution produced in step (iv) by passing compressed carbon dioxide there through, thereby producing a lithium carbonate precipitate, or b) wherein the lithium hydroxide solution produced in step (iv) is thickened by evaporation of water to provide lithium hydroxide monohydrate crystals, or c) a portion of the lithium hydroxide solution is carbonated to produce a lithium carbonate precipitate, and another portion is thickened by evaporation of water to provide lithium hydroxide monohydrate crystals;

wherein the lithium containing material is an alpha-spodumene ore or ore concentrate and the process further comprises a first step in which that alpha-spodumene ore or ore concentrate is calcined to produce beta-spodumene.

2. The process of claim 1, wherein the impurity removal step (ii) further comprises a concentration step such that the process solution is 35 to 40% w/w lithium chloride.

3. The process of claim 1, wherein the impurity removal steps of step (ii) include one or more of hydropyrolysis of Al and Fe chlorides, pH increase to precipitate hydroxides of Al, Fe, Mg and Mn, lithium carbonate precipitation for removal of Ca, and fractional crystallisation for removal of Na and K.

4. The process of claim 3, wherein the fractional crystallisation for the removal of Na and K is conducted after a concentration step provided in the impurity removal step (ii).

5. The process of claim 1, wherein the impurity removal steps comprise an ion exchange step.

6. The process of claim 5, wherein the ion exchange step removes substantially all calcium, magnesium and other multivalent cations remaining in the process solution.

7. The process of claim 6, wherein such multivalent cations are removed to a level of less than about 10 ppm.

8. The process of claim 6, wherein such multivalent cations are removed to a level of about 1 ppm.

9. The process of claim 1, wherein water evaporated from the lithium hydroxide solution produced in step (iii) is recompressed, combined with make-up steam and recycled to evaporation/crystallisation as a heating medium.

10. The process of claim 9, wherein the evaporation/crystallisation step utilizes a vacuum evaporative crystalliser.

11. The process of claim 1, wherein the beta-spodumene is cooled and milled prior to step (i).

12. The process of claim 11, wherein the beta-spodumene is milled to less than about 300 µm.

13. The process of claim 11, wherein the beta-spodumene is milled to a $P_{80}$ of about 75 µm.

14. The process of claim 1, wherein the leach step is conducted at elevated temperature.

15. The process of claim 1, wherein the hydrochloric acid solution used in the leach step is about 20% HCl w/w.

16. The process of claim 15, wherein the elevated temperature of the leach step is about a boiling point of the hydrochloric acid solution used in the leach step.

17. The process of claim 1, wherein the leach step is conducted at atmospheric pressure.

18. The process of claim 1, wherein the leach step is conducted in a chlorination kiln at about 108° C. over a residence time of about 6 to 10 hours.

19. The process of claim 1, wherein the leach step is conducted over a residence time of about 8 hours.

20. A process for treatment of a lithium containing material, the process comprising the steps of:

(i) passing a lithium containing material to a leach step comprising a first leach stage and a second leach stage in which said lithium containing material is leached with hydrochloric acid to produce a pregnant leach solution;

(ii) thickening said pregnant leach solution in a first thickening stage coupled subsequent to the first leach stage and a second thickening stage coupled subsequent to the second leach stage to reduce passivation, thereby creating an overflow pregnant leach solution;

(iii) pyrohydrolysing said overflow pregnant leach solution from said first thickening stage and said second thickening stage, thereby converting any chlorides of aluminum and iron into insoluble oxides, removing same, and recovering residual hydrochloric acid that is utilized in the leach step (i), wherein an underflow from the first thickening stage coupled subsequent to the first leach stage is passed to the second leach stage and the second thickening stage coupled subsequent to the second leach stage, and wherein an underflow from the second thickening stage coupled subsequent to the second leach stage is passed to waste;

(iv) passing said pregnant leach solution from step (iii) to a series of impurity removal steps thereby providing a substantially purified lithium chloride solution;

(v) passing the purified lithium chloride solution of step (iv) to an electrolysis step in which lithium chloride and added water are consumed thereby producing a lithium hydroxide solution, chlorine, and hydrogen;

(vi) combining chlorine and hydrogen produced in the electrolysis step (v) to produce hydrochloric acid that is utilized in the leach step (i); and (vii) carbonating the lithium hydroxide solution produced in step (v) by passing compressed carbon dioxide there through, thereby producing a lithium carbonate precipitate, or b) wherein the lithium hydroxide solution produced in step (v) is thickened by evaporation of water to provide lithium hydroxide monohydrate crystals, or c) a portion of the lithium hydroxide solution is carbonated to produce a lithium carbonate precipitate, and another portion is thickened by evaporation of water to provide lithium hydroxide monohydrate crystals;

wherein the lithium containing material is an alpha-spodumene ore or ore concentrate and the process further comprises a first step in which that alpha-spodumene ore or ore concentrate is calcined to produce beta-spodumene.

* * * * *